United States Patent [19]

Hattori et al.

[11] Patent Number: 4,798,528

[45] Date of Patent: Jan. 17, 1989

[54] EXTRUDING DIE STRUCTURE FOR PLUNGER MOLDING MACHINE

[75] Inventors: Isao Hattori, Nagoya; Hifuo Noiri, Gifu, both of Japan

[73] Assignee: NGK Insulators, Ltd., Aichi, Japan

[21] Appl. No.: 149,949

[22] Filed: Jan. 29, 1988

Related U.S. Application Data

[63] Continuation of Ser. No. 917,542, Oct. 10, 1986, abandoned.

[30] Foreign Application Priority Data

Oct. 21, 1985 [JP] Japan .......................... 60-159847[U]

[51] Int. Cl.$^4$ .............................................. B29C 47/00

[52] U.S. Cl. ................................. 425/190; 425/376.1; 425/461

[58] Field of Search ............... 425/186, 187, 188, 190, 425/191, 192 R, 192 S, 193, 376.1, 381, 461, 465, 466

[56] References Cited

U.S. PATENT DOCUMENTS

| | | | |
|---|---|---|---|
| 4,348,165 | 9/1982 | Vostrovsky | 425/192 R |
| 4,361,530 | 11/1982 | Peer | 425/381 |
| 4,368,026 | 1/1983 | Budel et al. | 425/381 |

FOREIGN PATENT DOCUMENTS

| | | | |
|---|---|---|---|
| 71221 | 4/1985 | Japan | 425/466 |
| 10044 | of 1892 | United Kingdom | 425/188 |

*Primary Examiner*—Jay H. Woo
*Assistant Examiner*—C. Scott Bushey
*Attorney, Agent, or Firm*—Parkhurst, Oliff & Berridge

[57] ABSTRACT

An extruding die structure is used for a plunger molding machine. The extruding die structure comprises an extruding die structure body detachably mounted on an extruding die mounting portion of the plunger molding machine and having an extruding die at its front end and grooves in an outer circumference for positioning and fixing the extruding die structure body to the extruding die mounting portion, keys engaging the grooves for positioning and fixing the extruding die structure body, and hydraulic cylinders as key driving means provided in the extruding die mounting portion for engaging and disengaging the keys from the grooves of the extruding die structure body. After the extruding die structure body is positioned by the positioning key, the fixing keys are engaged with the grooves to fix the extruding die structure body to the extruding die mounting portion, without requiring manual troublesome operation, shorten the time required for mounting the extruding die structure.

1 Claim, 6 Drawing Sheets

EXTRUDING DIE STRUCTURE FOR PLUNGER MOLDING MACHINE

This is a continuation of application Ser. No. 917,542 filed Oct. 10, 1986, now abandoned.

BACKGROUND OF THE INVENTION

This invention relates to an extruding die structure for use in a plunger molding machine for producing molded products from ceramic batches.

In order to exchange an extruding die structure body to change shapes of extruded products molded by a prior art plunger molding machine a new extruding die structure body 41 (FIG. 1) is fixed to an extruding die mounting portion 42 of the plunger molding machine by screwing externally operable bolts 43 into internally threaded apertures formed in the extruding die mounting portion 42.

With this arrangement, however, such a mounting operation of the extruding die to be bolted to the extruding die mounting portion 42 is very troublesome and time-consuming. In addition, the phases of the die, die holder and cylinder may not be angularly aligned, thus deforming the molded product into the wrong shape and increasing the risk of defective products.

SUMMARY OF THE INVENTION

It is a principal object of the invention to provide an extruding die structure for a molding machine, which eliminates the disadvantage described above and whose extruding die is simple to be fixed to an extruding die mounting portion of the molding machine so as to be exchanged with ease.

In order to achieve this object, the extruding die structure for a plunger molding machine according to the invention comprises an extruding die structure body detachably mounted on an extruding die mounting portion of said plunger molding machine and having an extruding die at its front end and grooves in an outer circumference for positioning and fixing said extruding die structure body to said extruding die mounting portion, keys engaging said grooves for positioning and fixing the structure body, and key driving means provided in the extruding die mounting portion for engaging and disengaging said keys from said grooves of said extruding die structure body.

The key driving means are preferably hydraulic cylinders.

The plunger molding machine is used for molding a blank of a ceramic material.

With the above arrangement according to the invention, te key driving means is deenergized to retract the keys and then the extruding die structure body is mounted on the extruding die mounting portion. After the extruding die structure body is positioned by the use of the positioning key, the fixing keys are engaged with keyways to fix the extruding die structure body to the extruding die mounting portion. These keys can be automatically driven by the key driving means without requiring any manual troublesome operation, thereby shortening the time required for mounting the extruding die structure.

In order that the invention may be more clearly understood, preferred embodiments will be described, by way of example, with reference to the accompanying drawings.

DESCRIPTION OF THE PREFERRED EMBODIMENT

Figure 1:
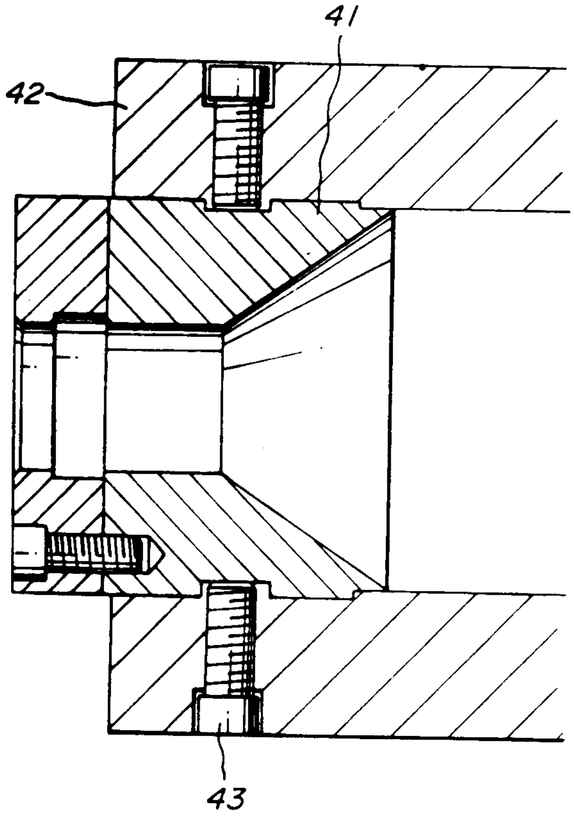
FIG. 1 PRIOR ART
FIG. 1 is a sectional view of an extruding die of the prior art.
Figure 2:
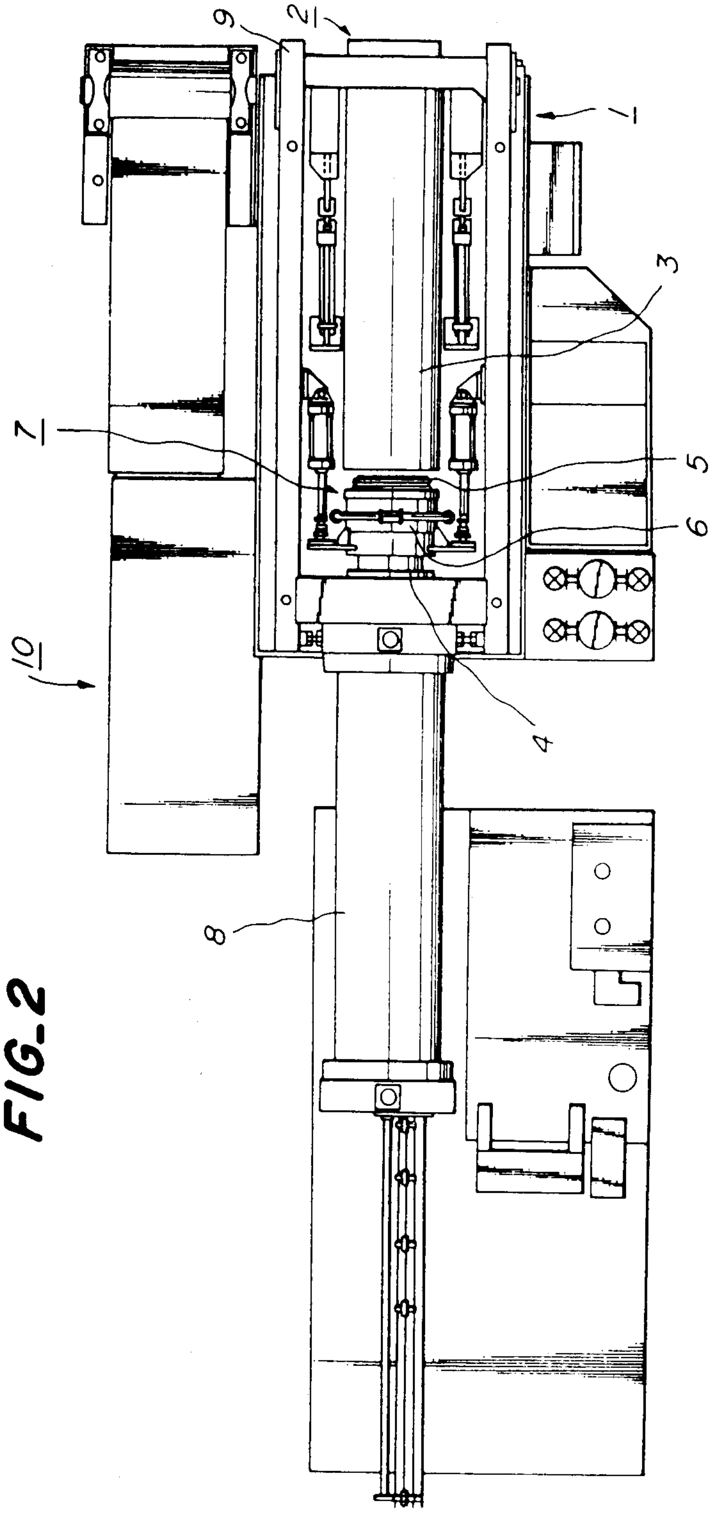
FIG. 2 is a view illustrating one embodiment of a plunger molding machine equipped with an extruding die structure according to the invention.

FIG. 2 is a schematic view illustrating one embodiment of a plunger molding machine equipped with the extruding die structure according to the invention. The plunger molding machine 1 in this embodiment comprises a material cylinder 3 having at one end an extruding die structure body 2 through which ceramic batches are extruded, an evacuating device 7 including a ram head 5 and an evacuating cap 6, and a hydraulic plunger 8 whose, piston 4 is connected to the evacuating device 7. These members are arranged on a base 9. With this arrangement, for example, a cylindrical blank of a ceramic material is loaded into the material cylinder 3 by means of a blank loading device 10 and thereafter the hydraulic plunger 8 is actuated to drive the ram head 5 through the piston 4 into the material cylinder 3 to extrude the blank through the extruding die structure body 2, thereby obtaining a desired molded product.

Figure 3A:
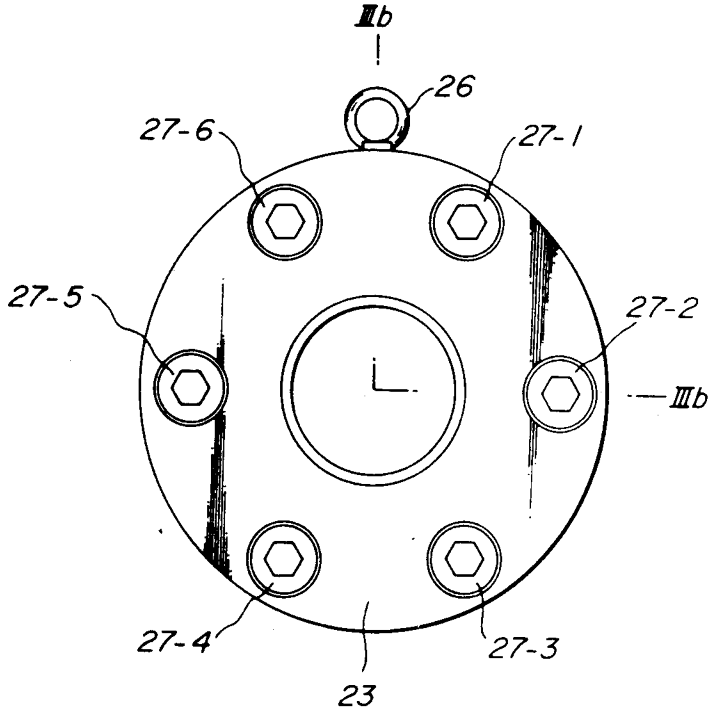
FIG. 3*a* is a side view illustrating one embodiment of the extruding die structure according to the invention.
Figure 3B:
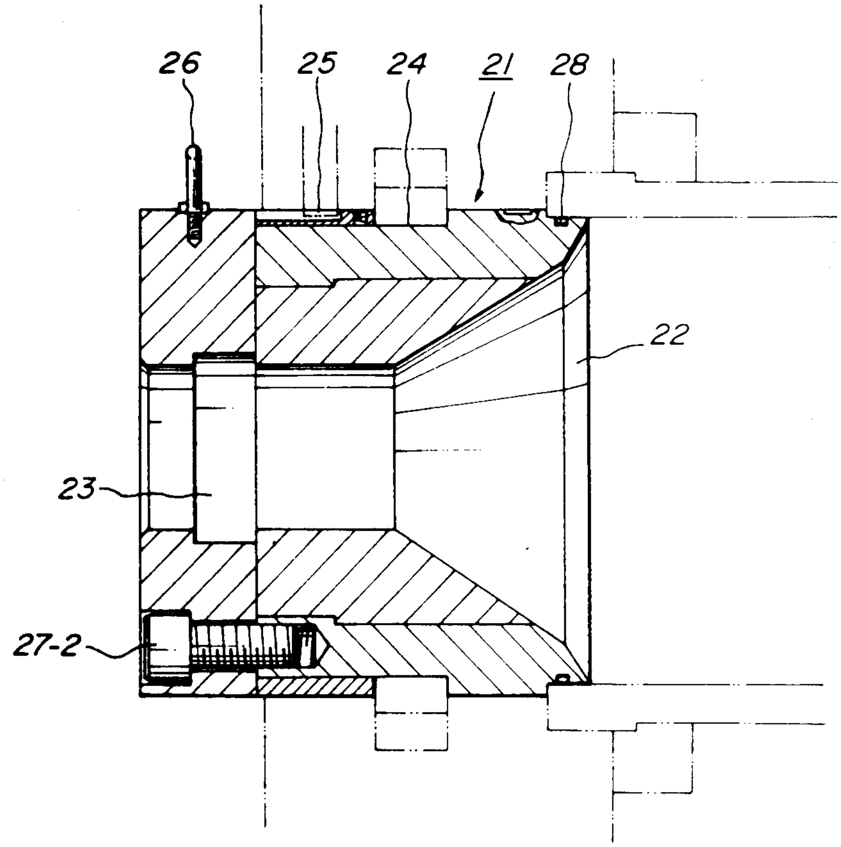
FIG. 3*b* is a sectional view taken along the line IIIb—IIIb in FIG. 3*a;*

FIGS. 3*a* and 3*b* are a plan view and a sectional view (taken along the line IIIb—IIIb in FIG. 3*a*) illustrating one embodiment of the extruding die structure according to the invention. The extruding die structure body 21 comprises at one end a batch supply opening 22 and at the other end an extruding die 23 having a desired configuration. In this embodiment, the batch supply opening 22 is made larger than an opening of the extruding die 23 so as to reduce diameters of a blank passing through the extruding die 23. The extruding die structure body 21 is formed in an outer circumference in its entirety with a fixing groove 24 and is further formed with in the outer circumference with a positioning groove 25 nearer to the extruding die 23 than the fixing groove 24. These fixing and positioning grooves 24 and 25 are formed so as to be able to receive fixing and positioning keys, respectively. The extruding die 23 is provided with an eyebolt 26 for transferring the extruding die structure body 21 and is fixed to a body of the extruding die structure body 21 by means of bolts 27-1 to 27-6. The extruding die structure body is further provided with an 0-ring 28 encircling the batch supply opening 22 to prevent the blank from escaping from the machine. The extruding die structure body 21 above described is previously formed for each extruding die 23 having a desired configuration.

Figure 4A:
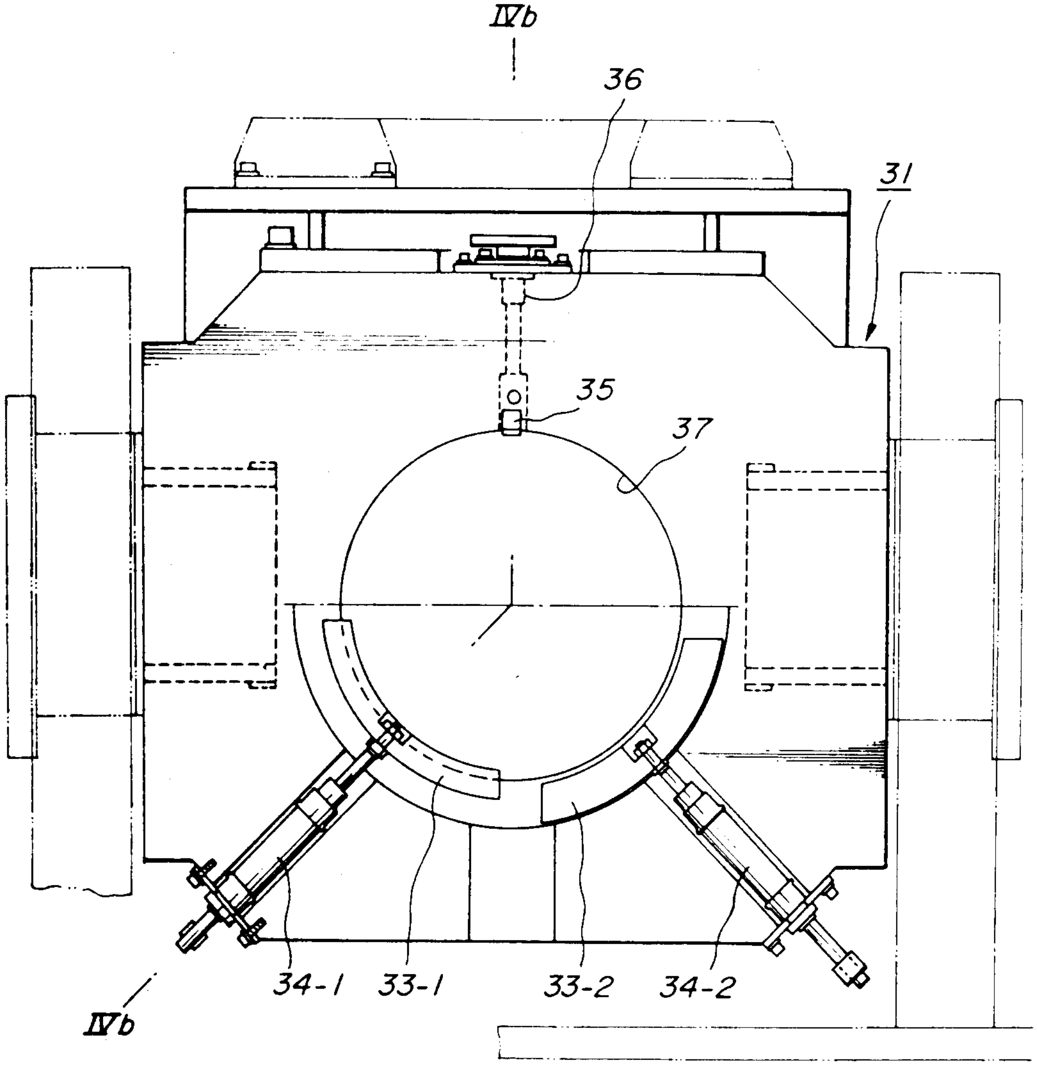
FIG. 4*a* is a side view illustrating one example of an extruding die mounting portion according to the invention.
Figure 4B:
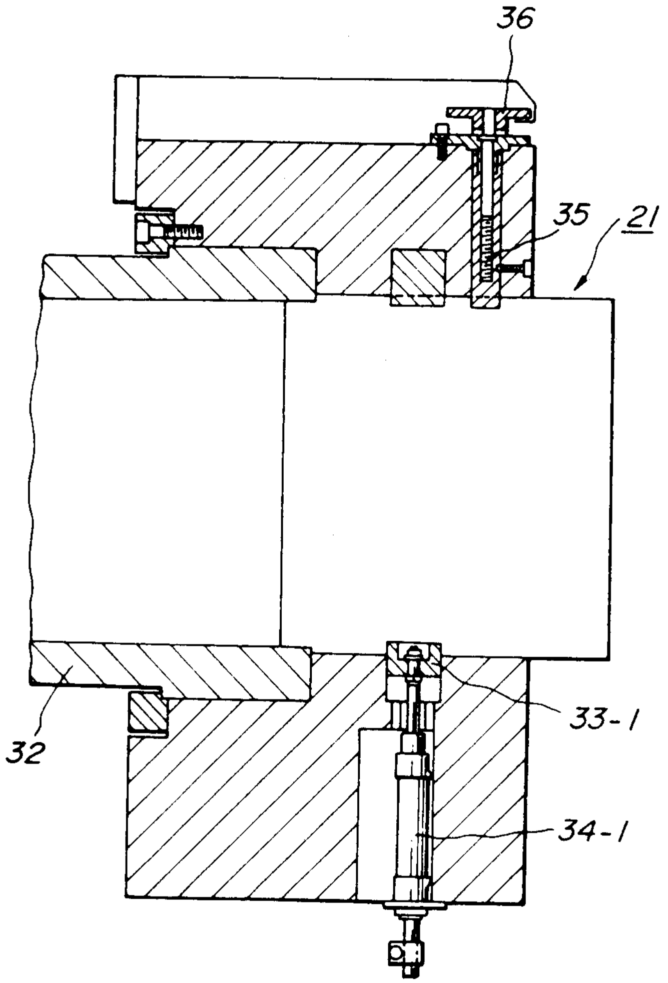
FIG. 4*b* is a sectional view taken along the line IVb—IVb in FIG. 4*a*.

FIGS. 4*a* and 4*b* are view a sectional view (taken along the line IVb—IVb in FIG. 4*a*) illustrating one example of the extruding die mounting portion according to the invention. The extruding die mounting portion 31 is provided at one end of a plunger molding machine 32 and comprises therein keys 33-1 and 33-2 adapted to engage fixing groove 24 when an extruding die structure body 21 is mounted on the extruding die mounting portion 31. Hydraulic cylinders 34-1 and 34-2 are provided for driving the keys 33-1 and 33-2. A key 35 adapted to engage the positioning groove is provided with key driving means 36. The keys 33-1 and 33-2 have a circular arc shape which is adapted to engage the fixing groove 24. These keys assume a mounting position where these keys are out of a mounting opening 37 when the extruding die structure body 21 is intended to be mounted in the extruding die mounting portion 31. After mounting the structure, these keys engage the positioning groove 25 to fix the entire extruding die structure body 21 to the machine. Moreover, although the keys and the hydraulic cylinders for driving them have been explained by referring to FIGS. 4*a* and 4*b* illustrating them in the lower half of the structure body, there are of course keys provided in the upper half of the structure to cooperate with the keys in the lower half to secure the extending die structure body 21.

It is further understood by those skilled in the art that the foregoing description is that of preferred embodiments of the disclosed structures and that various changes and modifications may be made in the invention without departing from the spirit and scope thereof. For example, although the four keys for fixing the structure are provided in the embodiment, this is only by way of example, and more or fewer keys could be provided so long as they are able to secure the extending die to the extruding die mounting portion.

Furthermore, according to the invention, means for inserting into or drawing the extruding die or extruding die structure body out of the material cylinder is preferably provided so as to enable the extruding die structure in unison to be mounted on or removed from the material cylinder.

What is claimed is:

1. An extruding die structure for a plunger molding machine, comprising: an extruding die structure body detachably mounted on an extruding die mounting portion of said plunger molding machine and having an extruding die at its front end, said extruding die structure body having a fixing groove formed in an outer circumference of said die body structure for fixing said extruding die structure body to said extruding die mounting portion and a positioning groove formed in an outer circumference of said die body structure for positioning said extruding die structure body in phase with said extruding die mounting portion, the positioning groove being located between said fixing groove and said extruding die, keys engaging said positioning and fixing grooves for positioning and fixing the structure body, and key driving means provided in the extruding die mounting portion for engaging and disengaging said keys from said positioning and fixing grooves of said extruding die structure body.

* * * * *